(12) United States Patent
Rosch

(10) Patent No.: US 8,404,605 B2
(45) Date of Patent: Mar. 26, 2013

(54) THREE PRESSURE HYDROGEN LOADING CYCLE FOR FUSED SILICA

(75) Inventor: William Rogers Rosch, Corning, NY (US)

(73) Assignee: Corning Incorporated, Corning, NY (US)

( * ) Notice: Subject to any disclaimer, the term of this patent is extended or adjusted under 35 U.S.C. 154(b) by 866 days.

(21) Appl. No.: 12/080,952

(22) Filed: Apr. 8, 2008

(65) Prior Publication Data
US 2009/0252947 A1 Oct. 8, 2009

(51) Int. Cl.
*C01C 1/00* (2006.01)
(52) U.S. Cl. .......... 501/54; 501/32; 501/53; 423/648.1; 423/335
(58) Field of Classification Search ............... 423/335, 423/648.1; 501/53–54, 32
See application file for complete search history.

(56) References Cited

U.S. PATENT DOCUMENTS

| 2003/0056537 A1* | 3/2003 | Marley et al. ........... 65/17.3 |
| 2005/0187092 A1* | 8/2005 | Bookbinder et al. ....... 501/54 |
| 2006/0234848 A1* | 10/2006 | Kuehn et al. ............ 501/54 |
| 2007/0066477 A1* | 3/2007 | Harper et al. ........... 501/54 |

* cited by examiner

*Primary Examiner* — Stuart Hendrickson
*Assistant Examiner* — Richard M Rump
(74) *Attorney, Agent, or Firm* — Robert P. Santandrea

(57) ABSTRACT

A method of loading at least one fused silica article with hydrogen. At least one fused silica article is first loaded with an amount of hydrogen so that the hydrogen concentration at the center of the article exceeds a minimum concentration upon completion of loading. An amount of hydrogen is the removed from the fused silica article so that the fused silica article has an average hydrogen concentration that is less than the maximum average concentration limit. The surface region of the fused silica article is then reloaded to ensure that the hydrogen concentration throughout the article is within a predetermined pressure range. A fused silica article comprising hydrogen is also described.

23 Claims, 7 Drawing Sheets

THREE PRESSURE HYDROGEN LOADING CYCLE FOR FUSED SILICA

BACKGROUND

The invention relates to fused silica. More particularly, the invention relates to fused silica comprising hydrogen. Even more particularly, the invention relates to methods of loading fused silica with hydrogen.

Fused silica articles that will be exposed to 193 nm excimer laser radiation, such as lenses and other optical components, are usually loaded prior to exposure with hydrogen ($H_2$) to mitigate the damage to the glass that is caused by the laser light. Such hydrogen loading typically involves establishing at least a minimum hydrogen concentration everywhere in the glass, while simultaneously keeping the average hydrogen concentration below a predetermined limit.

Hydrogen loading is accomplished by diffusing hydrogen into the glass in a furnace maintained at a temperature of less than about 500° C. The hydrogen concentration at or near the glass surface is determined by the combination of temperature and hydrogen partial pressure. Hydrogen concentration within the bulk of the fused silica is determined by diffusion rates and loading time. Since diffusion is slow, the time required to transport enough hydrogen through the glass to satisfy the minimum loading concentration everywhere in the fused silica may range from days to several months.

One method of loading fused silica with hydrogen combines temperature and pressure to set the $H_2$ concentration at the surface equal to the average loading limit. These single pressure loading conditions need to be maintained long enough for sufficient hydrogen to diffuse into the center of the part to exceed the loading minimum. Because the hydrogen level anywhere other than at the glass surface would be less than the surface concentration, glass loaded this way automatically remains below the average loading limit. However, the single pressure loading process can be an extremely lengthy because the hydrogen concentration at the glass surface is never that high, and the rate of diffusion into the glass is therefore relatively slow.

In an attempt to decrease the time needed to load fused silica with hydrogen, a two-step loading cycle is currently used. By using an elevated hydrogen partial pressure during the first step, more hydrogen initially enters the fused silica part than in the single pressure loading process. The higher initial amount of hydrogen reduces the loading time by allowing more hydrogen to diffuse to the center of the part at an early stage of loading, thus reducing the overall loading time. However, because much more hydrogen initially enters the part, the average concentration limit may be exceeded well before loading the entire part to the minimum concentration. The hydrogen pressure is therefore dropped during the second step to decrease the average concentration by removing some of the excess hydrogen near the surface, even as the $H_2$ concentration at the center of the part is still increasing. Compared to single pressure loading, such a two-step cycle is capable of reducing the loading time by more than 50%. Nonetheless, the time needed to load fused silica parts with a sufficient amount of hydrogen using the two-step process remains long.

In a production environment, it is often desirable to simultaneously load multiple fused silica parts having different thicknesses together in the same furnace. The two-step loading process also limits the range of thicknesses of fused silica parts that may be loaded together in the same furnace, as the time scale needed for the loading with hydrogen and subsequent unloading of the fused silica part depends on the thickness of the part.

SUMMARY

The present invention provides a method of loading at least one fused silica article with hydrogen. At least one fused silica article is first loaded with an amount of hydrogen so that the hydrogen concentration at the center of the article exceeds a minimum concentration upon completion of loading. In one embodiment, this is achieved by exposing the fused silica article to an atmosphere of about 1 atm pure hydrogen. An amount of hydrogen is then removed from the fused silica article so that the fused silica article has an average hydrogen concentration that is less than the maximum average concentration limit. In one embodiment, this is achieved by exposing the fused silica article to an atmosphere having a partial pressure of hydrogen of 0.0 atm. The surface region of the fused silica article is then reloaded to ensure that the hydrogen concentration throughout the article is within a predetermined pressure range. In one embodiment, this is achieved by exposing the article to an atmosphere having a partial pressure of hydrogen in a range from 0.1 atm up to about 0.25 atm. A fused silica article comprising hydrogen is also described.

Accordingly, one aspect of the invention is to provide a method of loading at least one fused silica article with a hydrogen concentration. The hydrogen concentration is within a predetermined concentration range having a maximum average concentration and a minimum concentration. The method comprises the steps of: providing the at least one fused silica article, the fused silica article having a surface region and a center portion; heating the at least one fused silica article at a predetermined temperature; loading the at least one fused silica article at the predetermined temperature with an amount of hydrogen such that the center portion of the fused silica article has a hydrogen concentration that exceeds the minimum concentration upon completion of loading the at least one fused silica article; removing sufficient hydrogen from the surface region of the fused silica article at the predetermined temperature such that the fused silica article has an average hydrogen concentration that is less than the maximum average concentration limit; and reloading the surface region at the predetermined temperature with hydrogen, such that the hydrogen concentration throughout the fused silica article is within the predetermined concentration range.

A second aspect of the invention is to provide a method of loading at least one fused silica article with a concentration of hydrogen. The method comprising the steps of: providing the at least one fused silica article; and heating the at least one fused silica article at a predetermined temperature under an atmosphere for a predetermined cycle time. Heating the at least one fused silica article comprises: heating the at least one fused silica article under an atmosphere consisting essentially of hydrogen for a first portion of the cycle time, wherein the first portion is at least 50% of the cycle time; heating the at least one fused silica article under a hydrogen-free atmosphere for a second portion of the cycle time; and heating the at least one fused silica article under an atmosphere comprising a partial pressure of hydrogen that is less than ambient pressure, wherein the concentration of hydrogen is the fused silica part is within a predetermined concentration range.

A third aspect of the invention is to provide a fused silica article. The fused silica article has a center, and outer edge, a center portion, and a surface region. The fused silica article also contains hydrogen, wherein the hydrogen concentration has a local maximum and local minimum between the center and the edge. The fused silica article has a maximum average hydrogen concentration and a minimum hydrogen concentration. Each of the center portion and the surface region has a hydrogen concentration in a range from the minimum hydrogen concentration up to the maximum average concentration.

These and other aspects, advantages, and salient features of the present invention will become apparent from the following detailed description, the accompanying drawings, and the appended claims.

DETAILED DESCRIPTION

Figure 1:
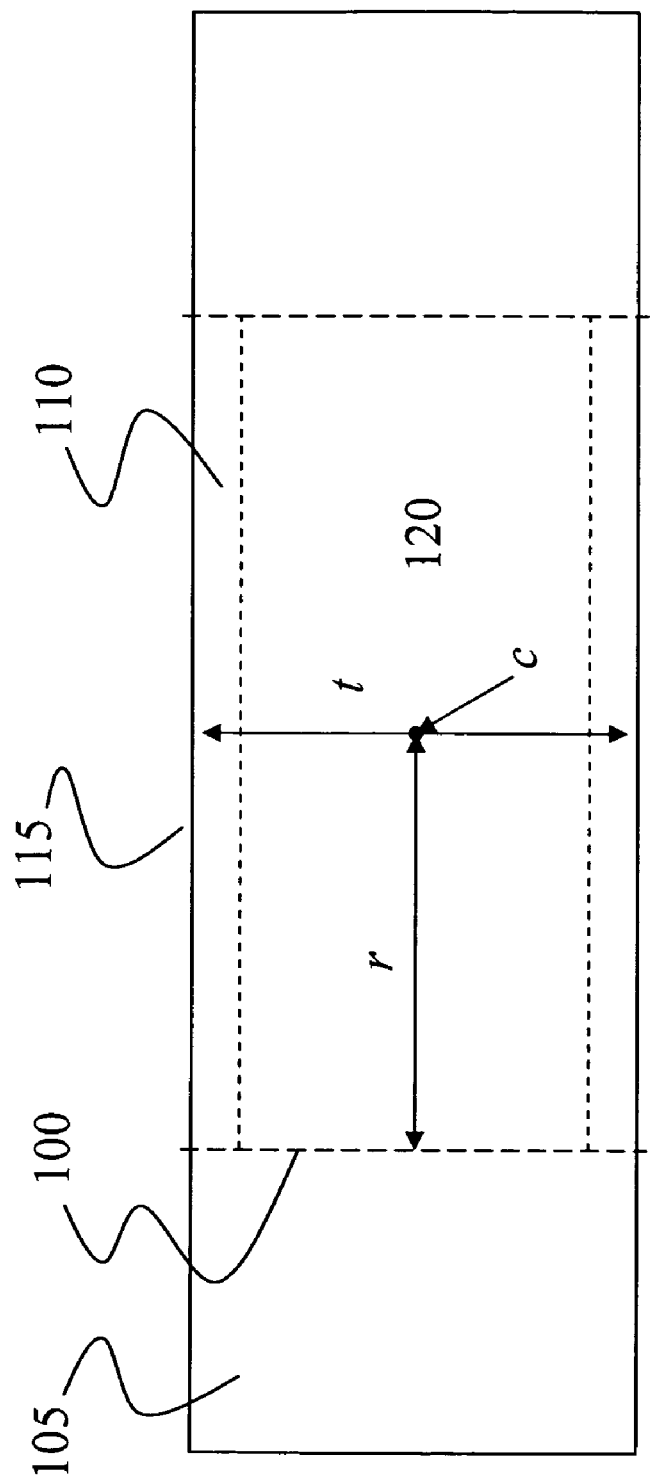
FIG. 1 is a schematic representation of a fused silica article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general and to FIG. 1 in particular, it will be understood that the illustrations are for the purpose of describing a particular embodiment of the invention and are not intended to limit the invention thereto. Turning to FIG. 1, a fused silica article 100 is schematically shown. Fused silica article having a radius r is cut from a larger fused silica boule 105. Fused silica article is typically cut from a center portion of fused silica boule 105. Fused silica boule 105 may be formed and worked by those methods known in the art. For example, fused silica boule 105 may be formed by consolidation or sintering of a soot blank formed by outside vapor deposition, vapor axial deposition, inside vapor deposition, planar soot deposition), sol/gel methods, or the like. Once formed, the soot blank may be subjected to drying (removal of hydroxyl groups), sintering/consolidation, and reworking steps that are know in the art to produce fused silica boule 105.

Fused silica article 100 has a geometrical center c, a thickness t, and an outer edge 115. Fused silica article 100 also has a surface region 110 and a center portion 120. Surface region 110 typically has a thickness of about 2.5% of thickness t, and extends from edge 105 into the bulk of fused silica article 100. Center portion 120 includes the remainder of fused silica article 100.

A fused silica article 100 having a center c, outer edge 115, center portion 120, and surface region 110 is provided. Fused silica article 100 contains hydrogen. The hydrogen concentration within fused silica article 100 has a local maximum and local minimum between center c and edge 115. Fused silica article 100 also has a maximum average hydrogen concentration and a minimum hydrogen concentration, wherein each of center portion 120 and surface region 110 have a hydrogen concentration less than the maximum average hydrogen concentration and greater than or equal to the minimum hydrogen concentration. In one embodiment, the maximum average hydrogen concentration is less than $1 \times 10^{17}$ molecules/cm$^3$ and the minimum hydrogen concentration is about $0.4 \times 10^{17}$ molecules/cm$^3$. In another embodiment, the minimum hydrogen concentration is about $0.8 \times 10^{17}$ molecules/cm$^3$.

A multi-step method of loading a fused silica article with hydrogen is also provided. As used herein, "loading" a fused silica article with hydrogen refers to the addition of molecular hydrogen (H$_2$) to a fused silica body by diffusion of gaseous H$_2$ into the fused silica to achieve a desired concentration of molecular hydrogen within the fused silica. As used herein, it is understood that, unless otherwise specified, the terms "molecular hydrogen," "hydrogen," and "H$_2$" include any combination of hydrogen isotopes (protium, deuterium, and tritium) and refer to diatomic hydrogen. Whereas those cycles and methods that are used to load fused silica with hydrogen typically include two steps, the loading methods described herein includes three steps. It has been found that the three step loading cycles described herein are superior to two step loading cycles in that the three step loading cycles achieve the same level of hydrogen loading in less time than that required by two step methods. In addition, the three step loading methods described herein allow simultaneous loading of dissimilar (i.e., having different thicknesses) fused silica articles to a desired hydrogen concentration level under identical conditions in a single furnace.

In the hydrogen methods described herein, at least one fused silica article is first provided. In one embodiment, the at least one fused silica article includes fused silica articles having different thicknesses. In a particular embodiment, a first fused silica article has a first thickness and a second fused silica article has a second thickness, wherein the first thickness is less than the second thickness and is greater than a predetermined percentage of the second thickness.

In order to mitigate damage to fused silica article 100 due to exposure to 193 nm laser radiation, it is desirable that fused silica article 100 be loaded with molecular hydrogen. The amount of hydrogen loaded into fused silica article should be sufficient to achieve an average concentration throughout fused article 100. In addition, the hydrogen concentrations in center portion 120 and surface region 110 should each be within a predetermined concentration range. In one embodiment, the average hydrogen concentration within fused silica article 100 is less than $1.0 \times 10^{17}$ molecules/cm$^3$ and the predetermined concentration range has a lower limit of about $0.4 \times 10^{17}$ molecules/cm$^3$ and an upper limit of less than $1 \times 10^{17}$ molecules/cm$^3$. In another embodiment the predetermined concentration range has a lower limit of about $0.8 \times 10^{17}$ molecules/cm$^3$ and an upper limit of less than $1 \times 10^{17}$ molecules/cm$^3$.

Fused silica article 100 is heated at a predetermined temperature by placing fused silica article 100 in a furnace, such as those known and used in the art for loading fused silica with hydrogen. The furnace is capable of heating fused silica article 100 under a controlled atmosphere having an absolute pressure that is essentially equal to ambient pressure (about 1 atm, or 1.01 bar). In one embodiment, the predetermined temperature is in a range from about 400° C. up to about 500° C.

At the predetermined temperature, fused silica article 100 is loaded with hydrogen (H$_2$) using a cycle comprising three steps and having a total cycle time. Unless otherwise specified, all steps of the loading cycle are carried out at the predetermined temperature. In the first loading step of the cycle, fused silica article 100 is loaded with hydrogen. The first loading step "pushes" or loads as much hydrogen into fused silica article 100 as can be accomplished without the use of a pressurized furnace (i.e., a furnace that is capable of operating at internal pressures that are greater than ambient pressure). By loading fused silica article 100 in the first loading step, more hydrogen initially enters fused silica article 100 and begins to diffuse from surface region 110 to center portion 120. The first loading step is of sufficient duration to provide load center c of fused silica article to a hydrogen concentration that is greater than the lower limit of the predetermined concentration range.

In one embodiment, the first loading step of loading fused silica article 100 with hydrogen comprises exposing fused silica article 100 to an atmosphere of pure hydrogen—i.e., consisting essentially of H$_2$—at a pressure of about 1 atm—for a first portion of the entire cycle time. Under a pure hydrogen atmosphere, fused silica article 100 is exposed to more hydrogen than it would be when exposed to a reduced partial pressure of hydrogen, as is typically done in a one step, constant loading process. Consequently, more hydrogen diffuses into center portion 120 and to center c. The first portion of the cycle time, in one embodiment, has a duration that is at least 50% of the total cycle time. In one embodiment, the first portion has a duration that is from 50% up to 65% of the total cycle time. The first portion of the cycle time may be sufficient to load fused silica article 100 with an average hydrogen concentration or, alternatively, to load central center c with a predetermined hydrogen concentration that is greater than the minimum concentration of the predetermined concentration range.

In the second loading step, hydrogen is removed from surface region 110 as quickly as possible to achieve an average hydrogen concentration that is less than the maximum average concentration which, in one embodiment, is less than $1 \times 10^{17}$ molecules/cm$^3$.

In one embodiment, the step of removing hydrogen from surface region 110 comprises exposing fused silica article 100 at the predetermined temperature to an atmosphere containing no hydrogen; i.e., the atmosphere is substantially free of H$_2$. The atmosphere comprises at least one inert gas such as, but not limited to, nitrogen, helium, argon, and the like, and has a total pressure of 1 atm. Fused silica article 100 is exposed to this hydrogen-free atmosphere for a second portion of the total cycle time. The second portion is sufficient to achieve an average hydrogen concentration that is less than the maximum desired hydrogen concentration. In one embodiment, the second portion of the loading cycle is in a range form about 10% up to about 40% of the total cycle time.

In the third loading step, surface region 110 of fused silica article 100 is reloaded with hydrogen at the predetermined temperature to ensure that the hydrogen concentration throughout fused silica article 100 is within the predetermined concentration range. In one embodiment, the step of reloading surface region 110 comprises exposing fused silica article 100 to an atmosphere comprising at least one inert gas and a non-zero, less than ambient, partial pressure of hydrogen for a third or remaining portion of the total cycle time. The third portion has a duration ranging from about 10% up to about 35% of the total cycle time. In one embodiment, the partial pressure of hydrogen during the reloading step is in a range from about 0.1 atm up to about 0.25 atm. In a particular embodiment, the partial pressure of hydrogen is about 0.2 atm (0.202 bar).

Hydrogen loading schedules that are currently used in the art allow multiple pieces of fused silica to be loaded with hydrogen simultaneously in the same furnace, with the proviso that all of the pieces have the same thickness. If fused silica articles of different thickness are simultaneously loaded with hydrogen under the same conditions, then each article, when loaded, will have a different hydrogen concentration profile. In a production environment, however, it is often desirable to place multiple fused silica articles having different thicknesses in a single furnace for hydrogen loading in order to provide a more efficient use of resources.

Using numerical modeling, it is possible to predict the times needed to load fused silica with a minimum concentration of hydrogen while not exceeding an maximum average concentration for a range of possible cycles and the resulting hydrogen concentration profiles. The diffusion-reaction model uses the finite difference method to calculate the hydrogen concentration for 1, 2, or 3 dimensional numerical grids as a function of time. Inputs into the model include the geometry of interest as well as a series of temperature and pressure steps. The model uses empirically defined relationships for the hydrogen diffusion and hydrogen solubility in the glass. Besides diffusion, the model also calculates any hydrogen-based reactions that might occur in the glass.

One process that is currently used to load fused silica articles with hydrogen combines temperature and constant hydrogen pressure in a single step to set the surface concentration equal to an average upper limit of the hydrogen concentration. In a hydrogen loading process having such a single step pressure cycle, a plurality of fused silica articles of any thickness range may be simultaneously loaded in a single furnace by exposing all articles to hydrogen for the time needed to load the thickest article. Thinner articles that are loaded during this process would be loaded more uniformly.

Figure 2:
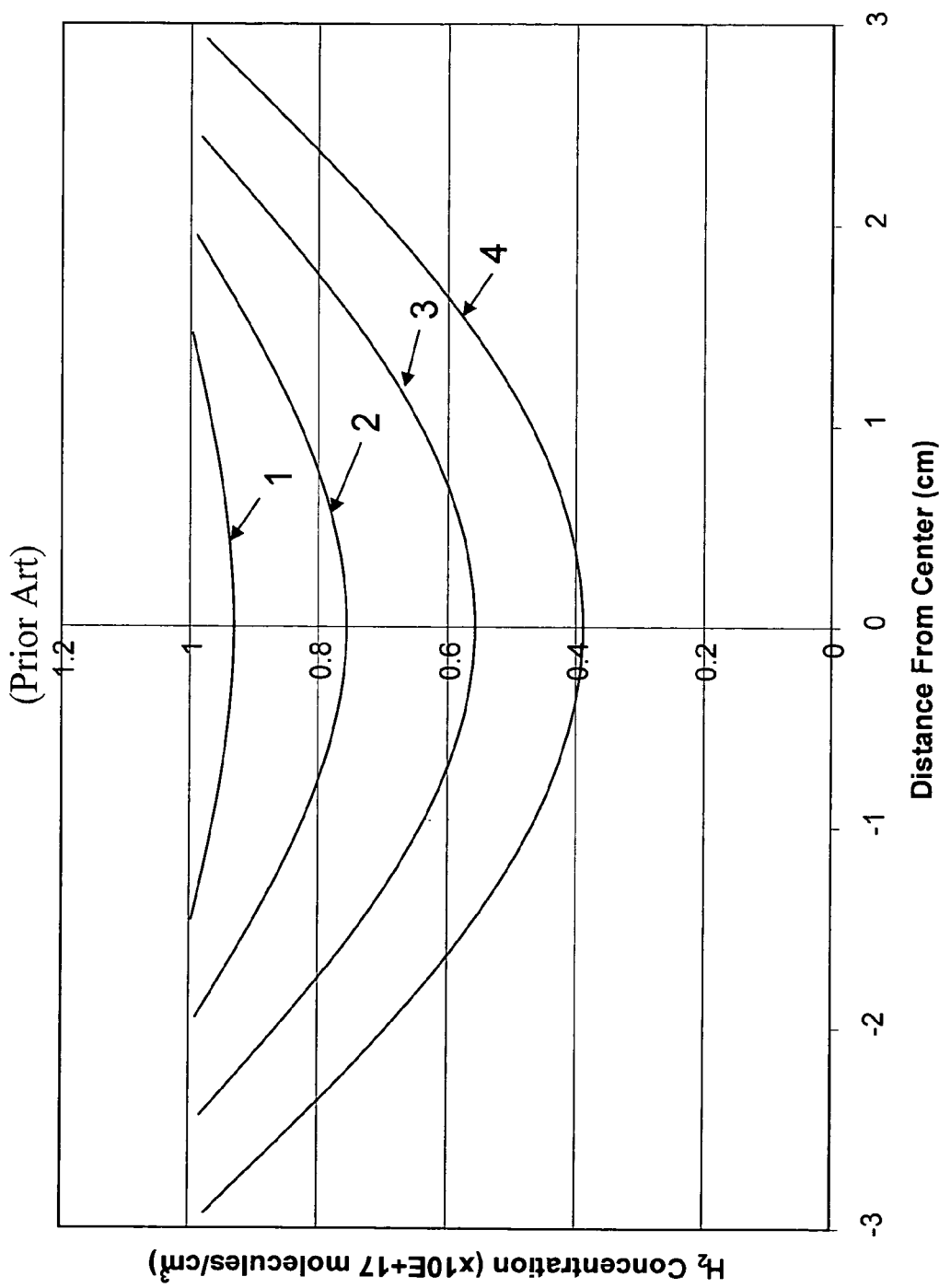
FIG. 2 a plot of hydrogen concentration profiles predicted by reaction-diffusion modeling for fused silica articles of different thicknesses loaded using a single-step constant pressure process.

Hydrogen concentration profiles predicted by the reaction-diffusion model described hereinabove are plotted in FIG. 2 for fused silica articles having thicknesses of 3, 4, 5 and 6 cm that have been subjected to the same single step constant pressure loading time. The loading cycle keeps the average hydrogen loading of all of the articles below $1.0 \times 10^{17}$ molecules/cm$^3$, while providing a minimum hydrogen loading of at least $0.38 \times 10^{17}$ molecules/cm$^3$ for the 6 cm thick part. The H$_2$ concentrations in all of the thinner parts exceed the minimum hydrogen concentration and are below the desired average level of $1.0 \times 10^{17}$ molecules/cm$^3$.

In a two-step loading process in which the fused silica article is loaded using an elevated hydrogen pressure in the first step and a reduced hydrogen pressure in the second step, the range of thicknesses of fused silica articles that can be simultaneously loaded with hydrogen in a single furnace is more restricted, as the time scale needed for loading and the subsequent unloading of the fused silica article with hydrogen is dependent in part upon the thickness of the article.

Figure 3:
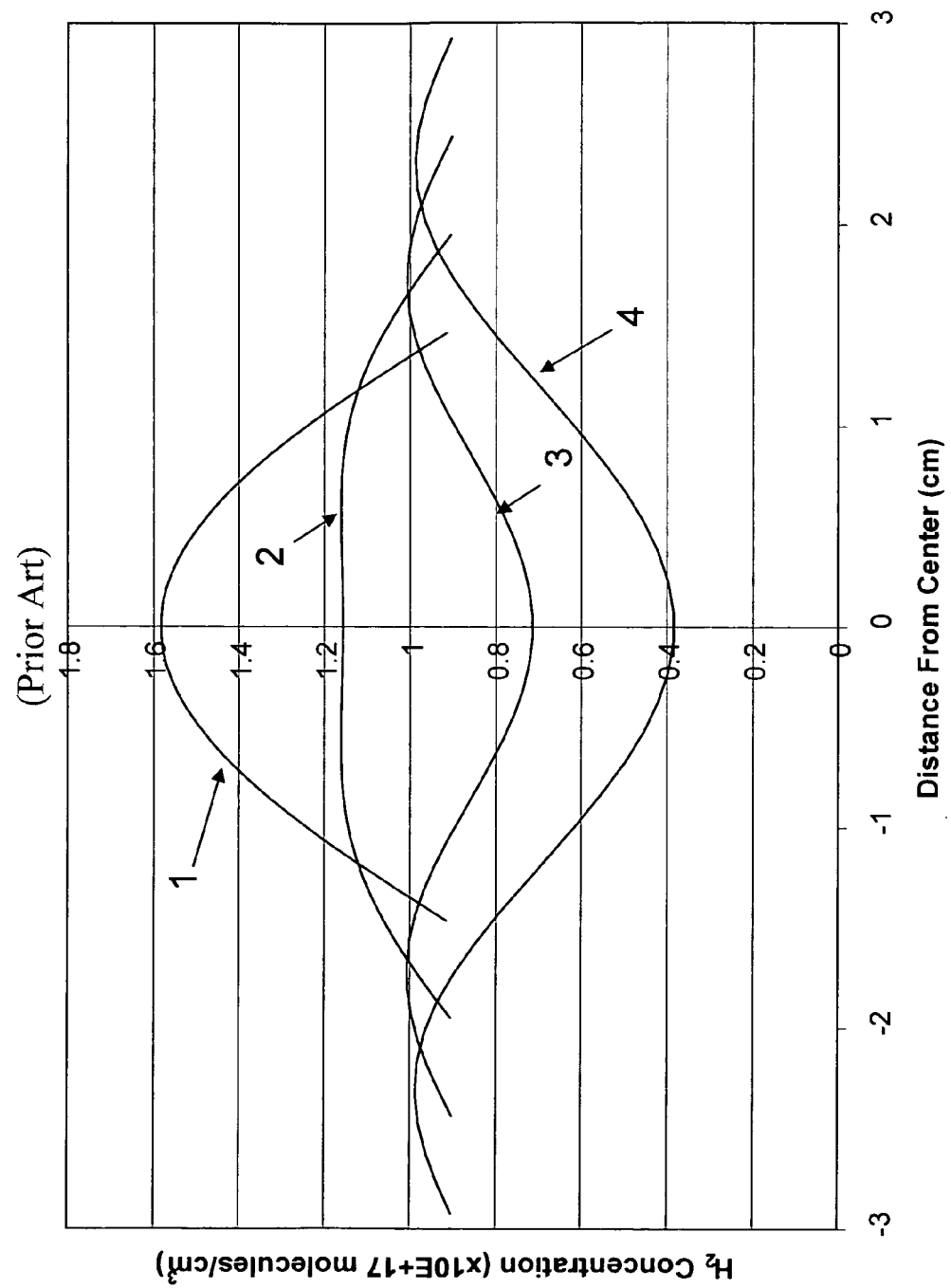
FIG. 3 a plot of hydrogen concentration profiles predicted by reaction-diffusion modeling for fused silica articles loaded using a two-step process.

Hydrogen profiles for fused silica articles having thicknesses of 3, 4, 5 and 6 cm are predicted using the hydrogen diffusion-reaction model described above. The calculations were based upon two-step hydrogen loading at 450° C. to a specification in which the average $H_2$ concentration in the 6 cm thick article is less than $1.0 \times 10^{17}$ molecules/cm$^3$ and the minimum $H_2$ concentration in the article is greater than $0.38 \times 10^{17}$ molecules/cm$^3$. Calculated hydrogen profiles are plotted in FIG. 3. The time needed to load the 6 mm thick article (a in FIG. 3) to the above specifications is less than half of that needed to load the 6 cm thick part using the single step constant pressure loading cycle (FIG. 2). If loaded simultaneously in the same furnace as the 6 mm thick article, however, the articles having thicknesses of 3 and 4 cm (c and d, respectively, in FIG. 3) would be overloaded with hydrogen and therefore not meet the $H_2$ loading specification.

In loading processes other than one step loading under constant $H_2$ pressure, hydrogen loading specifications affect the range of thicknesses of fused silica articles that can be simultaneously loaded in the same furnace. When the average $H_2$ concentration in the fused silica articles must be less than $1 \times 10^{17}$ molecules/cm$^3$, for example, a lower minimum concentration (e.g., $0.4 \times 10^{17}$ molecules/cm$^3$, as opposed to $0.8 \times 10^{17}$ molecules/cm$^3$) would allow fused silica articles having a wider the range of thicknesses to be loaded together.

Figure 4:
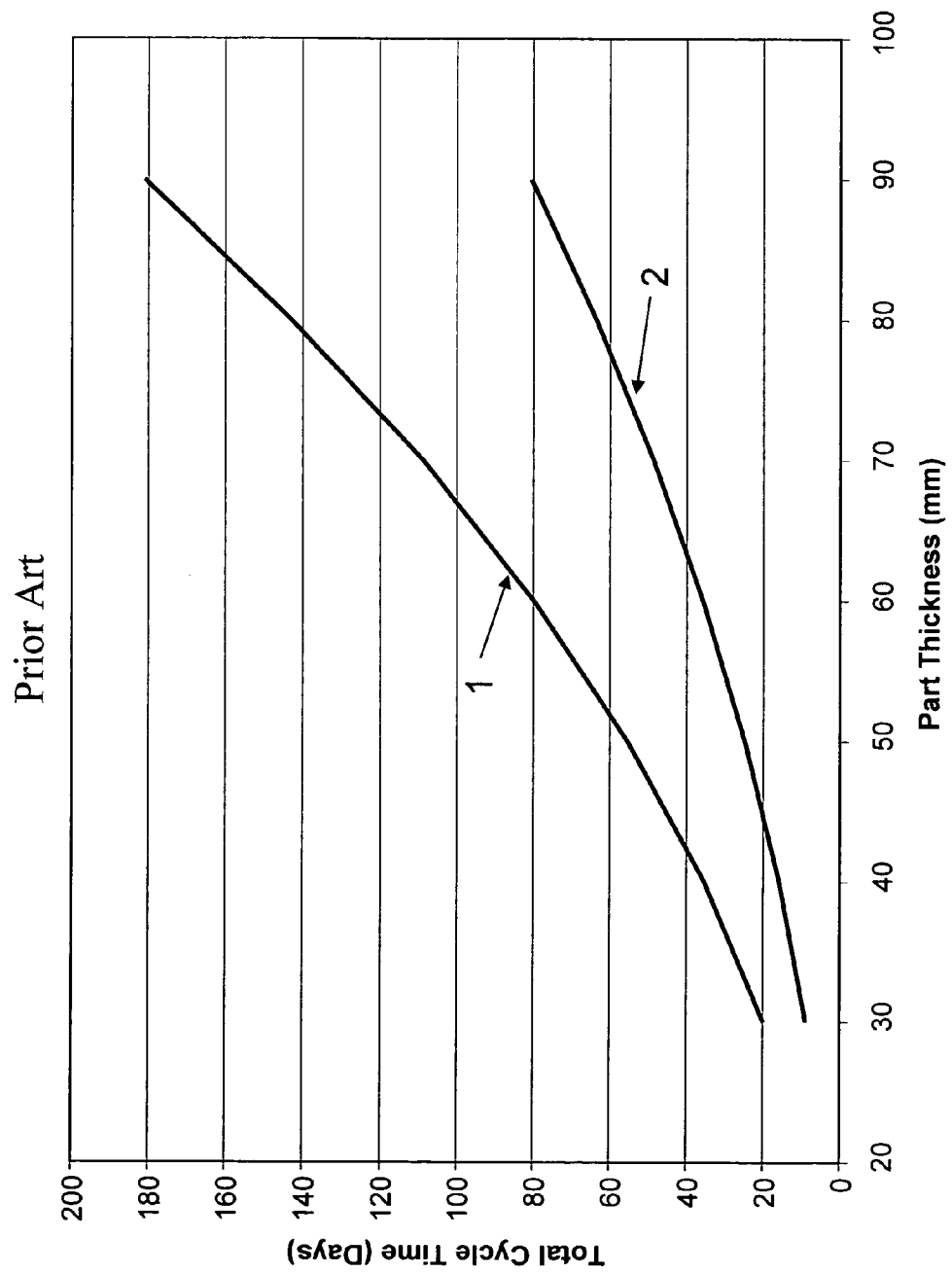
FIG. 4 is a plot showing the time required to load the center portions of fused silica articles having different thicknesses to a minimum hydrogen concentration of $0.4 \times 10^{17}$ molecules/cm$^3$ for: 1) single pressure loading; and 2) two-step variable pressure loading.

Based on modeling results, the times required to load the center portions of fused silica articles having different thicknesses to a minimum hydrogen concentration of $0.4 \times 10^{17}$ molecules/cm$^3$ for single-step, constant pressure loading (1 in FIG. 4) and the two-step loading cycle (2 in FIG. 4) are plotted and compared in FIG. 4. The model also assumes that the average hydrogen concentration in the fused silica article is to stay below $1.0 \times 10^{17}$ molecules/cm$^3$. Units of time are given on the y-axis. Any time that is on or above the lines shown in the graph should meet the above loading requirements for any of the thicknesses shown in the figure. As shown in FIG. 4, a longer cycle time is needed to reach the minimum concentration in the center of the fused silica article in the single-step, constant pressure cycle than that needed in the two-step variable pressure cycle.

In comparison to the one step, constant pressure loading cycle which has just one time constraint to reach, the two-step loading cycle has two constraints. Not only must each part be loaded long enough to reach the minimum concentration, but each part cannot be loaded too long, or else the desired average hydrogen concentration in the part will be exceeded. The times required to meet the minimum $H_2$ loading (2 in FIG. 5) at the center of a fused silica article and the maximum allowable time before the desired average $H_2$ concentration is exceeded (1 in FIG. 5) are plotted in FIG. 5 for fused silica articles having different thicknesses. In this case, it is assumed that the average $H_2$ concentration remains less than $1 \times 10^{17}$ molecules/cm$^3$. To properly load a fused silica article using the two-step cycle, the loading time must be between the two lines in FIG. 5 and therefore inside the available process window (3 in FIG. 5).

Figure 5:
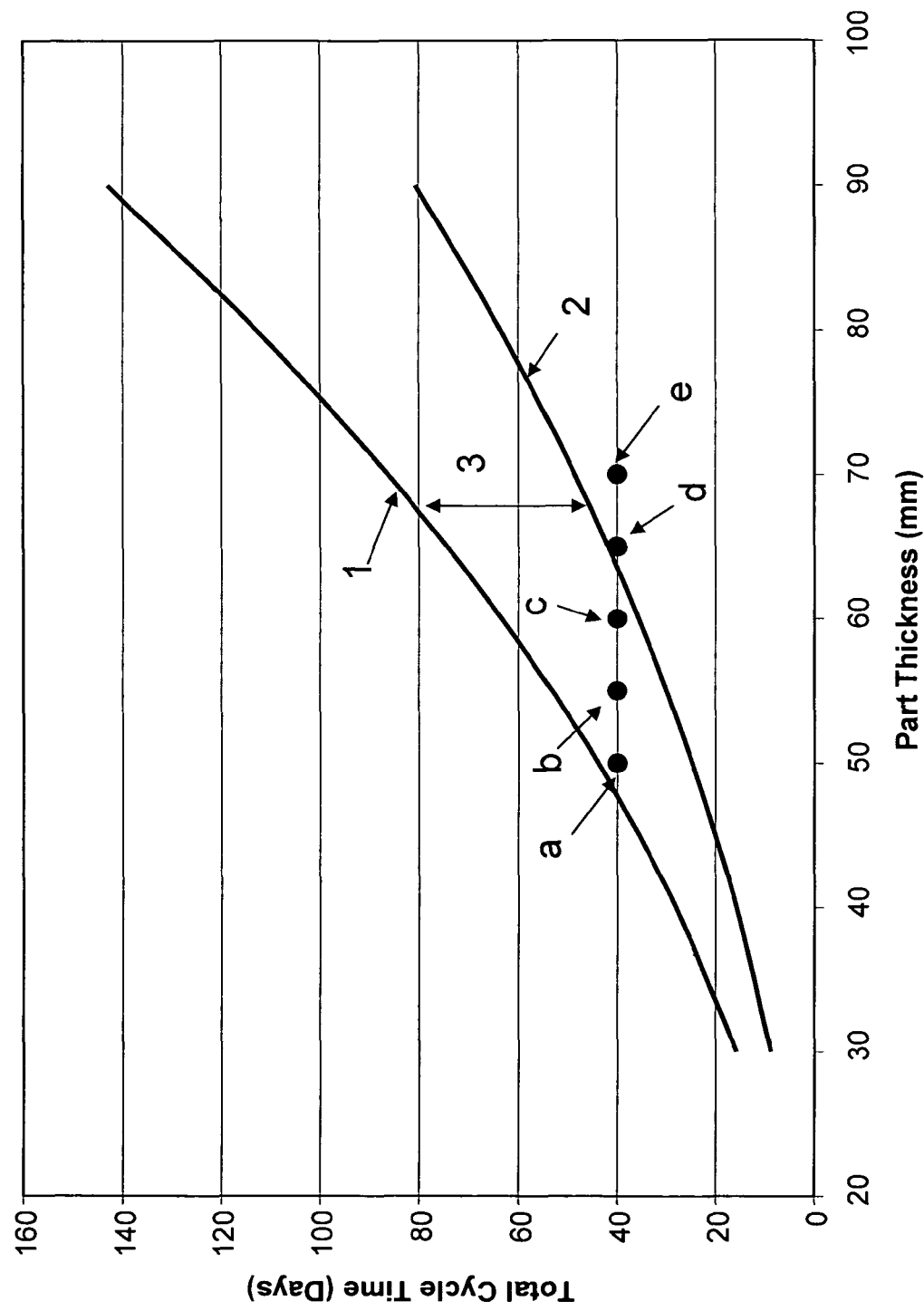
FIG. 5 is a plot of loading times required to meet the minimum and maximum H$_2$ loading levels at the center of a fused silica article for fused silica articles having different thicknesses.

The process window ultimately determines which part thicknesses can be loaded together. Since the times outlined in the process window vary with thickness, only some thicknesses will have overlapping process windows. FIG. 5 shows an example of hydrogen loading of fused silica articles having thicknesses of 50, 55, 60, 65, and 70 mm (a, b, c, d, e, in FIG. 5) together at 450° C. for 40 days. Modeling was performed for a two-step cycle in which the pressure is maintained at a first, elevated pressure for 50% of the total cycle time and at a reduced hydrogen pressure for the remaining 50% of the cycle time. The average $H_2$ concentration (1 in FIG. 5) is 0.995 atm, and the minimum $H_2$ concentration is 0.4 atm (2 in FIG. 5). Under these conditions, the 50, 55, and 60 mm thick parts (a, b, c in FIG. 5) would be loaded to achieve to minimum $H_2$ concentration, but the fused silica parts having thicknesses of 65 and 70 mm (d, e in FIG. 5) would not meet the required minimum $H_2$ loading requirement.

It is advantageous to use as short a loading cycle and as large a process window as possible. These objectives can be accomplished by decreasing the time needed to achieve the minimum loading concentration (shifting line 2 in FIG. 5 downward), increasing the time needed before exceeding the average concentration limit (shifting line 1 in FIG. 5 upward), or a combination of both.

In one embodiment, the methods described herein may be used to decrease the amount of time needed to load fused silica articles with a desired concentration of hydrogen. In another embodiment, use of the methods described herein enable a wider variation in thickness of the fused silica articles to be simultaneously loaded with hydrogen in the in the same furnace. In a third embodiment, the methods described herein may be used to both decrease the amount of time needed to load fused silica articles with hydrogen and enable a wider variation in thicknesses of the fused silica articles to be simultaneously loaded.

Example

The following predictive example illustrates the advantages and features of the invention and is no way intended to limit the invention thereto.

Numerical modeling methods that have been previously described herein are used to show that a three-step process with hydrogen partial pressures of 1.0 atm, 0.0 atm, and 0.20 atm provides an improvement over the currently used two-step, variable loading cycle for temperatures between 400° C. and 500° C. The first pressure pushes as much hydrogen into the part as is possible without going to pressures exceeding 1 atmosphere. This first step lasts for at least 50% of the total loading time and responsible for getting hydrogen to the center (center c, located in center portion 120 in FIG. 1) of the part as quickly as possible.

In the second step, a hydrogen partial pressure of 0.0 atmosphere is used to ensure that the average hydrogen concentration is less than the maximum average hydrogen concentration by removing hydrogen from the near surface area (surface region 110 in FIG. 1) of the fused silica article as quickly as possible. The hydrogen partial pressure is obtained by flowing a purge gas, such as nitrogen, argon, or the like through the furnace. Since the hydrogen concentration in the glass is higher than the $H_2$ concentration or partial pressure in the surrounding gas, some hydrogen will diffuse back out of the glass into the surrounding atmosphere, thus lowering the hydrogen average concentration within the fused silica article.

In the third step, the surface region of the fused silica article is reloaded under a hydrogen partial pressure of 0.20 atmospheres to ensure that the hydrogen concentration in the surface region is greater than a minimum predetermined concentration.

Numerical modeling results for different 3-step pressure loading cycles are compared in Table 1. Results obtained for the current two-step cycle, (Cycle Y in Table 1) serve as a baseline for the calculations and are included in Table 1. All other cycles listed in Table 1 are three-step cycles that have been described herein. "Cycle Ratios" refers to the ratio or percentage of the first, second, and third portions of the total cycle time. Hydrogen pressures 1.0 atm, 0.0 atm, and 0.20 atm were used for the first, second, and third portions, respectively, in the numerical modeling. The three step loadings are calculated using the hydrogen partial pressures (1 atm in the first step, 0 atm in the second step, and 0.2 atm in the third step) that have been previously described. The relative lengths of the different loading steps, expressed as percentages of total cycle time, are listed in the column labeled "Cycle Ratios." All results listed in Table 1 based on hydrogen loading being carried out at 450° C., and assume that the maximum loading concentration is less than $1 \times 10^{17}$ molecules/cm$^3$. Results obtained for a minimum loading concentration are shown for minimum loading levels of both $0.4 \times 10^{17}$ molecules/cm$^3$ and $0.8 \times 10^{17}$ molecules/cm$^3$.

TABLE 1

Comparisons of different three-step pressure hydrogen loading cycles to the current two-step (Y) cycle at 450° C.

| Cycle | Cycle Ratios | % Cycle Time Reduction | | Process Window Possible part variation % | |
|---|---|---|---|---|---|
| | | $0.4 \times 10^{17}$ minimum conc. | $0.8 \times 10^{17}$ minimum conc. | $0.4 \times 10^{17}$ minimum conc. | $0.8 \times 10^{17}$ minimum conc. |
| Y Cycle | Current | — | — | 34.0 | 7.7 |
| A Cycle | 65:10:25 | 7.9 | 14.1 | 7.4 | −10.6 |
| C Cycle | 65:25:10 | 7.8 | 12.4 | 20.3 | −0.8 |
| D Cycle | 50:15:35 | 3.4 | 4.0 | 35.2 | 9.0 |
| E Cycle | 50:40:10 | 3.4 | −49.4 | 60.7 | 3.9 |
| F Cycle | 60:30:10 | 7.0 | 11.9 | 31.4 | 8.5 |
| G Cycle | 50:35:15 | 3.4 | 2.9 | 52.7 | 22.5 |

As seen in Table 1, the $0.4 \times 10^{17}$ molecules/cm$^3$ minimum concentration can be achieved approximately 8% faster if the A cycle is used instead of the current three-step Y cycle. Similarly, the $0.8 \times 10^{17}$ molecules/cm$^3$ minimum concentration can be achieved approximately 14% faster if the A cycle is used. However, substitution of the A cycle for the Y cycle also reduces the process window from 34% to 7.4% when loading a fused silica article with a minimum hydrogen concentration of to a $0.4 \times 10^{17}$ molecules/cm$^3$, and a negative value when loading to $0.8 \times 10^{17}$ molecules/cm$^3$ minimum hydrogen concentration. The negative process window indicates that there is no cycle time that allows both the minimum H$_2$ concentration and maximum average concentration constraints to be met; i.e., the maximum time before the maximum average concentration is reached is less than the time needed to reach the minimum concentration. However, the substantial decrease in time needed to load the fused silica article to a minimum concentration of $0.4 \times 10^{17}$ molecules/cm$^3$ may in some instances outweigh the decreased process window for this cycle.

Similarly, hydrogen loading the article using the C cycle also decreases the cycle time compared to the Y cycle. In addition, the process window reduction associated with the C cycle is less than that associated with the A cycle. Compared to the A cycle, the C cycle offers nearly as much cycle time reduction, but a much larger increase in the process window.

Similar comparisons of the modeling results listed in Table 1 show that the E, F, and G cycles each have significant benefits over the current two step Y cycle. When used to load to a minimum H$_2$ concentration of $0.4 \times 10^{17}$ molecules/cm$^3$, the E cycle has the largest loading window and an appreciable cycle time reduction. The F cycle, with a 7% cycle time decrease, loads the fused silica article to a minimum H$_2$ concentration of $0.4 \times 10^{17}$ molecules/cm$^3$ faster than the E cycle, but has a process window range similar to that of the Y cycle. For 0.4 loading, The G cycle is similar to the E cycle for loading to a minimum H$_2$ concentration of $0.4 \times 10^{17}$ molecules/cm$^3$.

The results listed in Table 1 also indicate that, when loading to a minimum hydrogen concentration of $0.8 \times 10^{17}$ molecules/cm$^3$ specification, the loading time needed using the E cycle is greater than that of the current two-step Y cycle. In comparison to the Y cycle, the F cycle provides a similar process window size and nearly a 12% reduction in cycle time with. The G cycle shows a time savings of roughly 3% over the Y cycle while nearly tripling the process window.

Figure 6:
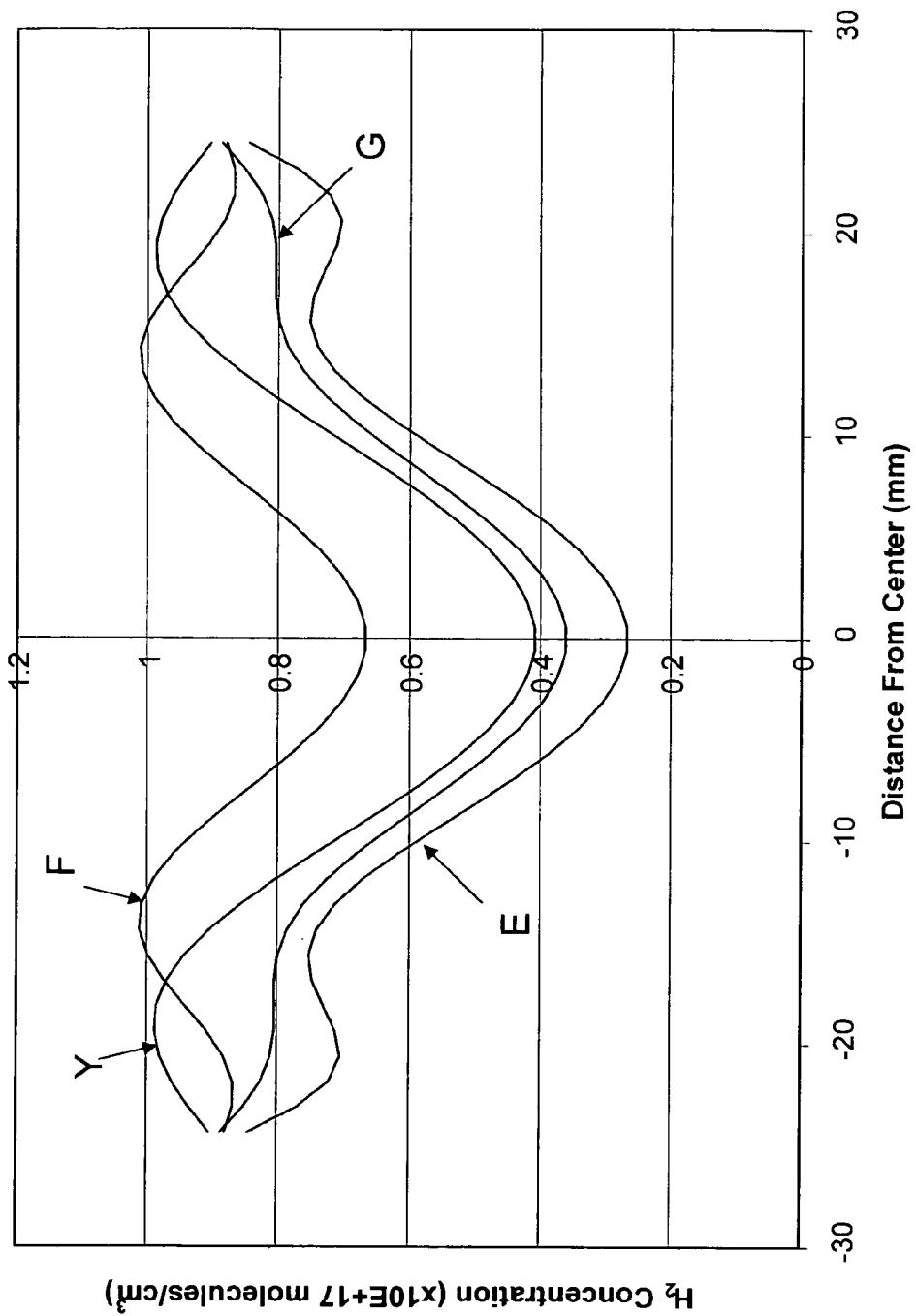
FIG. 6 is a plot of hydrogen concentration profiles obtained from numerical modeling for 25 day three-step hydrogen loading cycles.

Hydrogen concentration profiles obtained from numerical modeling for the Y, E, F and G cycles are plotted as functions of distance from the center of a fused silica article in FIG. 6. The numerical modeling that was used to generate the results shown in FIG. 6 was carried out for loading a 5 cm thick fused silica part at 450° C. for 25 days. These conditions were selected because they approximate those that are typically used in the Y cycle to load fused silica articles with a hydrogen concentration of $0.4 \times 10^{17}$ molecules/cm$^3$. The predicted final hydrogen concentration distribution for each cycle is plotted as a function of distance from center c of fused silica article 100 (FIG. 1).

Comparison of the hydrogen concentration profiles calculated for the different cycles show that the cycles produce nearly identical concentrations at edge 115 (FIG. 1). This is to be expected, since the edge concentration is determined mostly by the final loading conditions. The final hydrogen pressure (0.2 atm H$_2$ partial pressure) in the three-step cycles investigated is the same as that used in two-step cycle Y.

Figure 7:
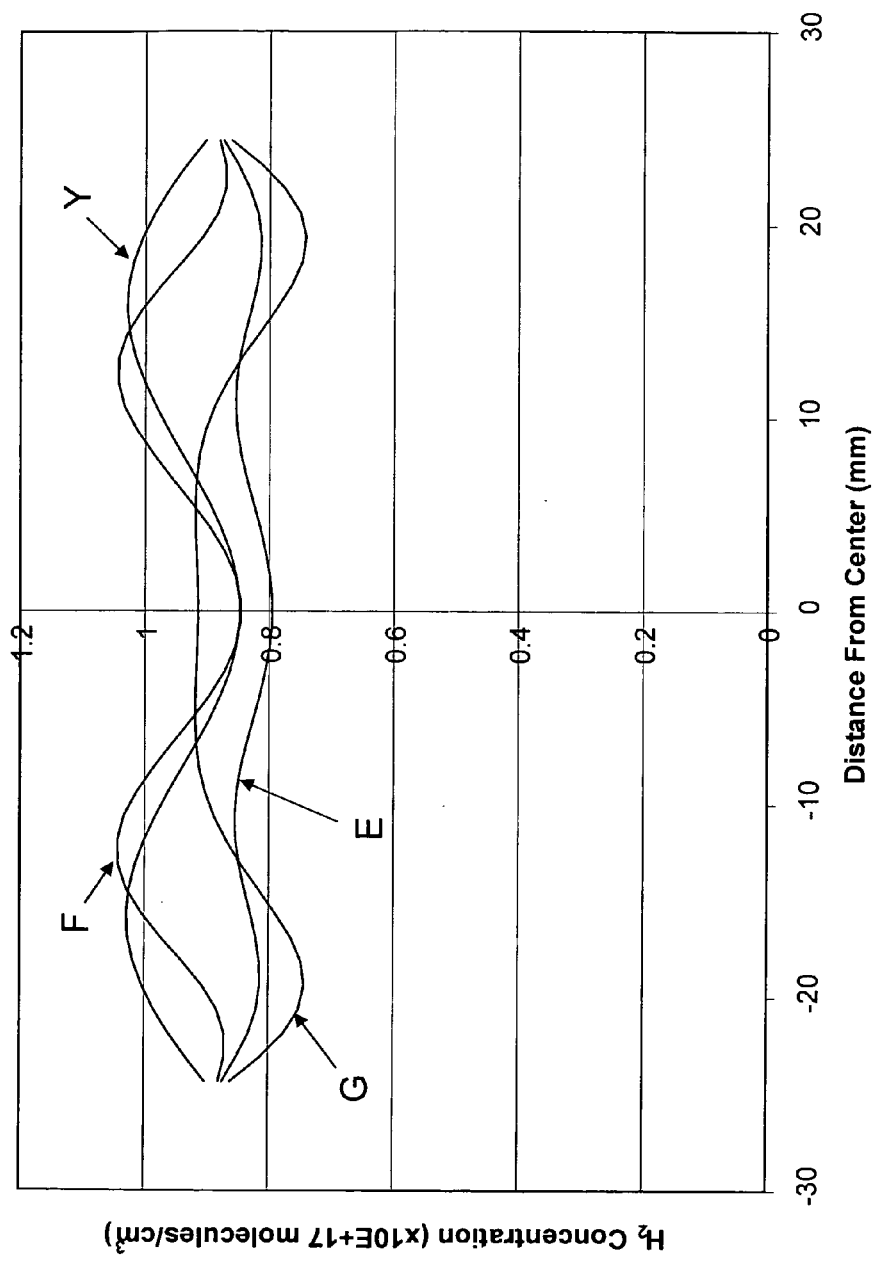
FIG. 7 is a plot of hydrogen concentration profiles obtained from numerical modeling for 40 day three-step hydrogen loading cycles.

Hydrogen concentration profiles calculated for a loading cycle length of 40 days are plotted as functions of distance from the center of a fused silica article in FIG. 7. The numerical modeling was used to generate the results shown in FIG. 7 was carried out for loading a 5 cm thick fused silica part at 450° C. The 40 day cycle length was selected approximates the time typically needed to load a 5 cm thick fused silica article to a minimum concentration of $0.8 \times 10^{17}$ molecules/cm$^3$ using the two-step Y cycle.

As seen in FIG. 7, the hydrogen profile obtained using the E cycle has a local minimum that is less than 0.8. The E cycle therefore has to be run for an additional time period to raise the hydrogen concentration at this local minimum to a value that is within the predetermined concentration range. At the end of the 40 day loading cycle, the F cycle would have exceeded a average hydrogen concentration limit of $1.0 \times 10^{17}$ molecules/cm$^3$. Based on numerical modeling, however, hydrogen loading of a 5 cm part to the concentration in this range using the F cycle would actually be complete after about 34 days. Finally, the hydrogen profile for the G cycle is nearly uniform throughout the thickness of the fused silica article.

The modeling results in Table 1, and FIGS. 6 and 7 show that the three-step E cycle, when loading fused silica parts to a minimum hydrogen concentration of $0.4 \times 10^{17}$ molecules/cm$^3$, is capable of loading the broadest range of part thicknesses with a somewhat shorter cycle time than the two-step Y cycle. In those instances where a minimum hydrogen concentration of either 0.4 or $0.8 \times 10^{17}$ molecules/cm$^3$ is desired, the F cycle provides faster hydrogen loading than the Y cycle without decreasing the process window in comparison to the current two-step Y cycle. The G cycle yields results similar to those obtained with the E cycle for hydrogen loading to $0.4 \times 10^{17}$ molecules/cm$^3$. When used for loading fused silica parts to a minimum hydrogen concentration of $0.8 \times 10^{17}$ molecules/cm$^3$, however, use of the three-step G cycle reduces loading time by about 3% while tripling the process window.

Numerical modeling results for 3-step pressure loading cycles E, F, and G for furnace temperatures of 425° C., 450° C., and 475° C. are compared to those obtained for two-step cycle Y in Table 2. All other cycles listed in Table 2 are three-step cycles that have been described herein. The results are similar for those obtained at 450° C., which are listed in Table 1.

TABLE 2

Numerical modeling results obtained for three-step E, F and G cycles compared to the two-step Y cycle for temperatures of 425° C., 450° C., and 475° C.

| Loading Temp (° C.) | Cycle | % Cycle Time Reduction | | Process Window % of min time | |
|---|---|---|---|---|---|
| | | 0.4 min | 0.8 min | 0.4 min | 0.8 min |
| 425 | Y cycle | — | — | 28.5 | 4.1 |
| | E Cycle | 3.5 | −27.8 | 52.6 | 7.4 |
| | F Cycle | 6.8 | 11.5 | 25.8 | 4.5 |
| | G Cycle | 3.4 | 2.9 | 45.7 | 17.7 |
| 450 | Y cycle | — | — | 34.0 | 7.7 |
| | E Cycle | 3.4 | −49.4 | 60.7 | 3.9 |
| | F Cycle | 7.0 | 11.9 | 31.4 | 8.5 |
| | G Cycle | 3.4 | 2.9 | 52.7 | 22.5 |
| 475 | Y cycle | — | — | 39.5 | 11.4 |
| | E Cycle | 3.3 | −71.2 | 69.8 | 1.9 |
| | F Cycle | 7.1 | 12.4 | 36.8 | 12.5 |
| | G Cycle | 3.2 | −13.3 | 60.1 | 18.2 |

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A method of loading at least one fused silica article with a concentration of hydrogen that is within a concentration range having a maximum concentration of less than $1 \times 10^{17}$ molecules/cm$^3$ and a minimum concentration of about $0.4 \times 10^{17}$ molecules/cm$^3$, the method comprising the steps of
   a. providing the at least one fused silica article, the fused silica article having a surface region and a center portion;
   b. heating the at least one fused silica article at a temperature in a range from about 400° C. up to about 500° C.;
   c. loading the at least one fused silica article at the temperature with an amount of hydrogen, such that the center portion of the at least one fused silica article exceeds the minimum concentration upon completion of loading the at least one fused silica article;
   d. removing hydrogen from the surface region of the fused silica article at the temperature, such that the fused silica article has an average hydrogen concentration that is less than the maximum concentration; and
   e. reloading the surface region at the temperature with hydrogen, such that the hydrogen concentration throughout the fused silica article is within the concentration range.

2. The method according to claim 1, wherein the step of providing at least one fused silica article comprises providing a first fused silica article having a first thickness and a second fused silica article having a second thickness, and wherein the first thickness is at least 1 cm less than from the second thickness.

3. The method according to claim 1, wherein the step of loading the at least one fused silica article at the temperature with hydrogen comprises exposing the at least one fused silica article to an atmosphere consisting essentially of hydrogen for a first portion of the total cycle time, wherein the first portion is at least 50% of the total cycle time.

4. The method according to claim 3, wherein the step of exposing the at least one fused silica article to an atmosphere consisting essentially of hydrogen comprises exposing the at least one fused silica article to a hydrogen pressure of about 1 atm.

5. The method according to claim 1, wherein the step of removing hydrogen from a surface region of the at least one fused silica article at the temperature comprises exposing the at least one fused silica article to an atmosphere comprising an inert gas, and wherein the atmosphere is substantially free of hydrogen for a second portion of the total cycle time.

6. The method according to claim 5, wherein the second portion is in a range from about 10% of the total cycle time up to about 40% of the total cycle time.

7. The method according to claim 1, wherein the step of removing hydrogen from the surface region of the at least one fused silica article at the temperature comprises removing hydrogen from the surface region of the at least one fused silica article such that the hydrogen concentration in the surface region is less than about $1 \times 10^{17}$ molecules/cm$^3$.

8. The method according to claim 1, wherein the step of reloading the surface region of the at least one fused silica article at the temperature with hydrogen to a second concentration of hydrogen comprises exposing the at least one fused silica article to an atmosphere comprising an inert gas and a partial pressure of hydrogen, wherein the atmosphere has a total pressure of about 1 atm.

9. The method according to claim 8, wherein the partial pressure of hydrogen is about 0.1-0.25 atm.

10. The method according to claim 1, wherein the lower limit is $0.8 \times 10^{17}$ molecules/cm$^3$ and an upper limit of less than $1 \times 10^{17}$ molecules/cm$^3$.

11. A method of loading at least one fused silica article with a concentration of hydrogen, the method comprising the steps of:
   a. providing the at least one fused silica article;
   b. heating the at least one fused silica article at a temperature under an atmosphere for a cycle time, wherein the temperature is in a range from about 400° C. up to about 500° C., and wherein heating the at least one fused silica article comprises:
      i. heating the at least one fused silica article under an atmosphere consisting essentially of hydrogen for a first portion of the cycle time, wherein the first portion is at least 50% of the cycle time;
      ii. heating the at least one fused silica article under a hydrogen-free atmosphere for a second portion of the cycle time; and
      iii. heating the at least one fused silica article under an atmosphere comprising a partial pressure of hydrogen that is less than ambient pressure, wherein the concentration of hydrogen in the fused silica part is within a concentration range and has a maximum concentration of less than $1 \times 10^{17}$ molecules/cm$^3$ and a minimum concentration of about $0.4 \times 10^{17}$ molecules/cm$^3$, and wherein a center portion of the at least one fused silica article has a hydrogen concentration that exceeds the minimum concentration.

12. The method according to claim 11, wherein the step of providing at least one fused silica article comprises providing a first fused silica article having a first thickness and a second fused silica article having a second thickness, and wherein the first thickness is at least 1 cm less than the second thickness.

13. The method according to claim 11, wherein the step of heating the at least one fused silica article under an atmosphere consisting essentially of hydrogen for a first portion of the cycle time comprises heating the at least one fused silica article under an atmosphere consisting essentially of hydrogen for a first portion of the cycle time, wherein the pressure of the atmosphere is substantially equal to ambient pressure.

14. The method according to claim 11, wherein the first portion of the cycle time has a duration in a range from 50% up to about 65% of the cycle time.

15. The method according to claim 11, wherein the second portion has a duration in a range from about 10% up to about 40% of the cycle time.

16. The method according to claim 11, wherein the third portion has a duration in a range from about 10% up to about 25% of the cycle time.

17. The method according to claim 11, wherein the step of heating the at least one fused silica article under an atmosphere comprising a partial pressure of hydrogen that is less than ambient pressure comprises heating the at least one fused silica article under an atmosphere comprising a partial pressure of hydrogen of about 0.2 atm.

18. The method according to claim 11, wherein the concentration range has a lower limit of about $0.8 \times 10^{17}$ molecules/cm$^3$ and an upper limit of less than $1 \times 10^{17}$ molecules/cm$^3$.

19. A fused silica article containing hydrogen, the fused silica article having a center, and outer edge, a center portion, and a surface region, wherein the fused silica article has a maximum hydrogen concentration, wherein each of the center portion and the surface region have a hydrogen concentration in a range from a minimum hydrogen concentration of less than $1 \times 10^{17}$ molecules/cm$^3$ up to the maximum concentration and a minimum concentration of about $0.4 \times 10^{17}$ molecules/cm$^3$, wherein the hydrogen concentration has a local maximum and local minimum between the center and the edge, and wherein the hydrogen concentration of the center portion exceeds the minimum hydrogen concentration.

20. The fused silica article according to claim 19, wherein the maximum hydrogen concentration is less than $1 \times 10^{17}$ molecules/cm$^3$ and the minimum hydrogen concentration is about $0.4 \times 10^{17}$ molecules/cm$^3$.

21. The fused silica article according to claim 19, wherein the maximum hydrogen concentration is less than $1 \times 10^{17}$ molecules/cm$^3$ and the minimum hydrogen concentration is about $0.8 \times 10^{17}$ molecules/cm$^3$.

22. A method of loading at least one fused silica article with a concentration of hydrogen that is within a concentration range having a maximum concentration of less than $1 \times 10^{17}$ molecules/cm$^3$ and a minimum concentration of about $0.4 \times 10^{17}$ molecules/cm$^3$, the method comprising the steps of:
   a. providing a plurality of silica articles, each having a surface region and a center portion, wherein the plurality of fused silica articles comprises a first fused silica article having a first thickness and a second fused silica article having a second thickness, and wherein the first thickness is at least 1 cm less than from the second thickness;
   b. heating the at least one fused silica article at a temperature in a range from about 400° C. up to about 500° C.;
   c. loading the at least one fused silica article at the temperature with an amount of hydrogen, such that the center portion of the at least one fused silica article exceeds the minimum concentration upon completion of loading the at least one fused silica article;
   d. removing hydrogen from the surface region of the fused silica article at the temperature, such that the fused silica article has an average hydrogen concentration that is less than the maximum concentration; and
   e. reloading the surface region at the temperature with hydrogen, such that the hydrogen concentration throughout the fused silica article is within the concentration range.

23. The method according to claim 22, wherein each of the first thickness and the second thickness are in a range from 3 cm up to 6 cm.

* * * * *